May 18, 1937. M. H. TRACY 2,080,549
AUTOMOBILE BODY GLASS CUTTING PATTERN
Filed April 21, 1936
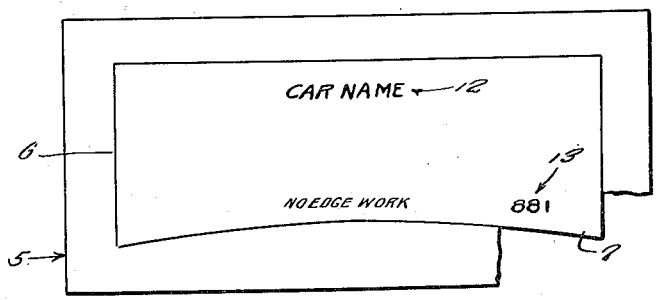
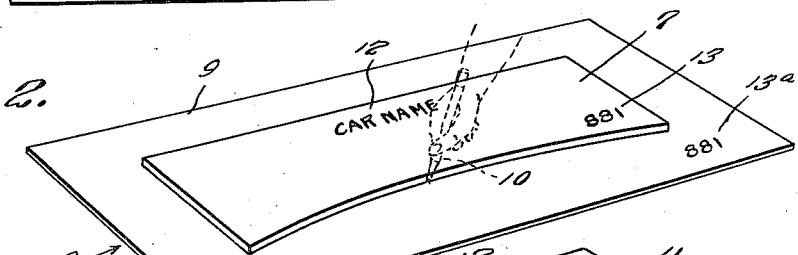
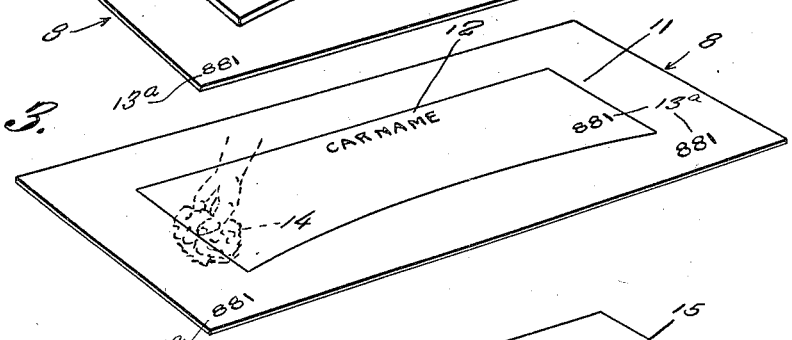
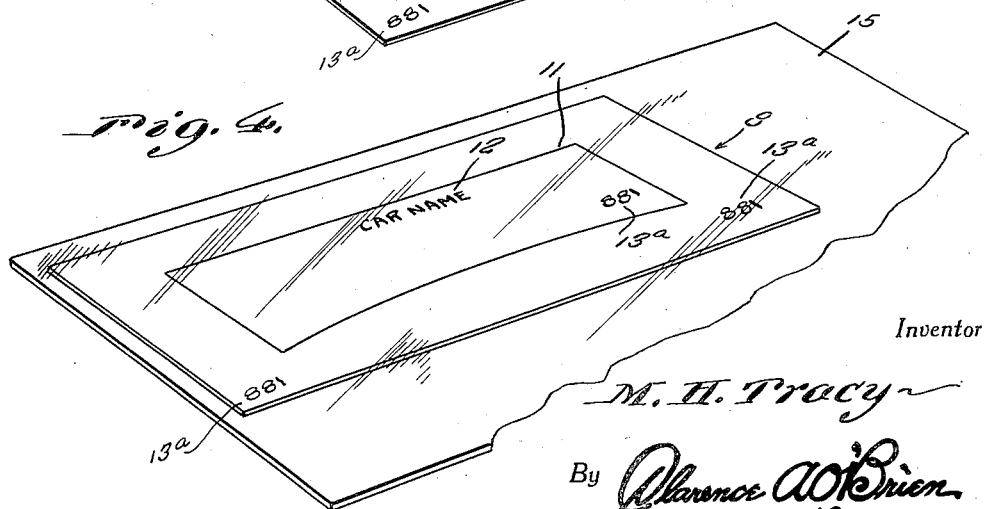
Inventor
M. H. Tracy
By Clarence A. O'Brien
Hyman Berman
Attorneys Patented May 18, 1937

2,080,549

UNITED STATES PATENT OFFICE 2,080,549

AUTOMOBILE BODY GLASS CUTTING PATTERN

Madison H. Tracy, Detroit, Mich.

Application April 21, 1936, Serial No. 75,653

1 Claim. (Cl. 33—1)

This invention relates to the automobile body glass art in so far as it pertains to accessories and appliances, and has reference in particular to what may be typified as a new and novel glass supporting and cutting pattern.

Fundamentally, the broad concept of the invention arose from the discovery of the need for a special service and systematic manner of handling automobile body glass replacement tasks. That is to say, the idea originated with the conception that a real service, satisfying public needs, could be promoted by providing local glaziers with proper and reliable equipment whereby daily orders for replacement glass could be satisfactorily filled.

The automobile and body glass heretofore referred to has reference in particular to windshields, side door windows, adjustable ventilators, and rear window lights. Manifestly, there is repeated daily need in the average garage to supply a customer with a new windshield or the like, and as the sizes and proportions vary on different models and yearly makes of automobiles, some systematic means must be worked out whereby the average garage can supply its customers with substitute windshields and the like.

Specifically and structurally visualized, the novelty, as will hereinafter be discerned, is devoted to an ingenious glass supporting and cutting pattern characterized by a sheet of compressible fiberboard of an area to underlie the major portion of the plate glass, the glass supporting surface of the pattern having a figure of a predetermined outline thereon and the figure being located wholly within the marginal limits of the fiberboard and having its marginal portions spaced from the marginal edges of the fiberboard so as to permit the glass to be placed thereon and so that the figure may be seen through the transparency of the glass as a guiding pattern in cutting that portion of the glass over the figure while the remaining edge portion of the glass is elevated and supported by the underlying marginal portion of the pattern.

In order that the reader may better appreciate the particular nature of the pattern and the features and advantages thereof, reference is herein made, indirectly, to a so-called method, no claim being directed to the sequential steps or other aspects of said method.

In the drawing:

Figure 1 is a top plan view, with a portion broken away, of a master template in the making;

Figure 2 is a perspective drawing illustrating how the finished template is utilized as a drawing guide for constructing one of a plurality of duplicate patterns;

Figure 3 is a perspective drawing of the finished pattern disclosing how the indelible pencil outline is wiped over with a wet sponge to visibly bring out the marker lines of the pattern to be cut;

Figure 4 is a view showing how a plate or sheet of glass is placed on the pattern, with the indelible pencil line seen through the glass to facilitate cutting the glass to correspond with the pattern.

The sequential or methodical steps followed may be systematically described as follows: First, it is necessary to make an original drawing to facilitate the manufacture of the master guide or template. This is made from a blueprint (not shown), which blueprint gives the exact measurements of a predetermined automobile body glass for a definite make of automobile, such as for example, a Plymouth, a Ford, or the like. Each model, style, and year of the car varies and consequently the body glass utilized therein varies. This means that it is necessary, in accordance with my system, to make a template for each piece of glass for each conventional automobile. Thus, as shown in Figure 1, I utilize for this purpose a piece of binder's board 5 on which the original drawing 6 is carefully made with requisite exactness. This permits cutting the template 7 from the binder's board whereby to permit the template to be used over and over for making the pattern 8.

Secondly, the template is sent to the fabricating department where the various duplicate patterns 8 are made. The pattern 8 is drawn on a proportionately thinner sheet 9 of solid newsboard possessing appropriate cushioning and durable properties. That is to say, the template is placed on the sheet 9 and an indelible pencil 10 is drawn around the marginal edges thereof to form the outline 11 of the glass to be later cut therefrom. Any number of patterns are made from the one master guide or template 7. Each template has the name of the car printed thereon, as indicated at 12 and has an appropriate indexing or serial number 13 which corresponds to a serial number 13ª on the pattern. The pattern also carries the name of the car and has other directions printed thereon for convenience of the user. In order to finish the pattern a wet sponge 14 is washed around the indelible drawn line and this brings out the configuration of the glass clearly.

These patterns 8, which are full size, are shipped to glaziers in different localities who cut the various windshield and other body glass for the local garages. For each make of car there will be one template for the windshield, others for the window glasses, ventilators, and rear windows, as is obvious. These are all properly serially numbered and systematically placed away in a rack (not shown) where they are handy for use when needed. The glazier is also provided with a special directory or guide book, which I perfected to permit the results to be accomplished satisfactorily. In this guide book (not shown), the various makes of cars are listed and the requirements or specifications for glasses are systematically set down for ready reference purposes. It follows, therefore, that if a windshield is needed for a 1930 Ford, the glazier simply looks in the book, locates the specification for that particular windshield, goes to the rack and extracts the desired pattern 8 therefrom. Obviously, the book carries corresponding serial numbers so that this result can be promptly accomplished.

Having located the pattern, the sheet of glass 15 is placed thereon as indicted in Figure 4, and the desired cut is made using the readily visible indelible line 11 as a definite guide for the cutting operation. At this time it is understood that the pattern, being constructed of newsboard, possesses requisite cushioning and pad properties so that during this cutting operation it elevates the glass above the table or other surface and tends to minimize breakage due to strain at the edge portions thereof.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

As a new article of manufacture, an automobile body glass supporting and cutting pattern comprising a sheet of compressible fibre board having requisite stability and cushioning properties and of an area to underlie the major portion of the plate of glass placed thereon, the glass supporting surface of said pattern having a figure of a predetermined outline formed thereon, said figure being located wholly within the marginal limits of said fibre board and having its marginal portions spaced from the marginal edges of the fibre board, whereby to permit the glass to be placed thereon so that the figure may be seen through the transparency of the glass and employed as a guiding pattern in cutting that portion of the glass over the figure while supporting the remaining portion of the glass on the portion of the board located between the figure and marginal edges of said board.

MADISON H. TRACY.